United States Patent [19]
Feiock et al.

[11] Patent Number: 5,226,818
[45] Date of Patent: Jul. 13, 1993

[54] FIREFIGHTER TRAINING SYSTEM WITH THERMAL AGENT DETECTION

[75] Inventors: Douglas H. Feiock, Baltimore; Mark R. Layton, Severna Park, both of Md.; Lester L. Smith, Shrewsbury, Pa.; Ramon L. Palmer, Jr., Cockeysville, Md.

[73] Assignee: AAI Corporation, Hunt Valley, Md.

[21] Appl. No.: 796,938

[22] Filed: Nov. 25, 1991

[51] Int. Cl.$^5$ .......................................... G09B 19/00
[52] U.S. Cl. .................................... 434/226; 434/219
[58] Field of Search .............. 434/226, 219; 432/19, 432/25, 46

[56] References Cited

U.S. PATENT DOCUMENTS

| | | | |
|---|---|---|---|
| 3,675,342 | 7/1972 | Wolff | 35/10 |
| 3,967,614 | 7/1976 | Stroud | 432/46 X |
| 4,303,396 | 12/1991 | Swiatosz | 434/226 |
| 4,303,397 | 12/1981 | Rogers et al. | 434/226 |
| 4,424,023 | 1/1984 | Matsuoka | 432/19 |
| 4,526,548 | 7/1985 | Livingston | 434/226 |
| 4,861,270 | 8/1989 | Ernst et al. | 434/226 |
| 4,983,124 | 1/1991 | Ernst et al. | 434/226 |
| 5,055,050 | 10/1991 | Rogers et al. | 434/226 |

OTHER PUBLICATIONS

Brochure entitled "FireTrainer T-2000 Gas-Fueled Firefighter Training System", AAI Corporation (1990).
S. Sansone and A. Aroneo, "New Fire Simulator At FDNY Training Academy", *WNYF* (With New York Firefighters), 2nd Issue, pp. 8–11 (1987).
E. Swiatosz, W. Guthrie, and H. Cadle, "New Developments in Navy Fire Fighter Trainers", *1st Interservice/Industry Training Equipment Conference*, pp. 217–227 (1979).

*Primary Examiner*—Gene Mancene
*Assistant Examiner*—L. Thomas
*Attorney, Agent, or Firm*—Venable, Baetjer & Howard

[57] ABSTRACT

A system and method is disclosed for providing control of a fuel-operable burner assembly of a firefighter trainer in accordance with a sensed environmental parameter such as the temperature of an object such as a metal grating or prop that is positioned adjacent to the burner assembly. The control system and method are particularly advantageous to simulate fire reflash following substantial extinguishment of the fire, as operational parameters such as the rate of flame growth, maximum flame height, and reflash delay can be selected and varied from one scenario to the other to modify the training scenario in accordance with such factors as trainee proficiency and the type or class of fire. Burner control is preferably accomplished by an automated processing system in accordance with the foregoing environmental and operational parameters.

36 Claims, 9 Drawing Sheets

SCENARIO NAME: ABC

| | SET | OPTIONS |
|---|---|---|
| ▶ PREHEAT TEMPERATURE (°F) | 100 | 100–300°F |
| MAXIMUM FLAME HT. (ft.) | 6 | 1–12 ft. |
| FLAME GROWTH TIME (sec) | 5 | 5–60 secs. |
| EXTINGUISH TEMP. LEVEL (°F) | 100 | 100–150°F |
| FLASHOVER ENABLE | Y | Y/N |
| REFLASH ENABLE | Y | Y/N |
| REFLASH TEMP. ACTUATION (°F) | 220 | 150–250°F |

TRAINER COMPARTMENT NO.1

B1
B2

LEGEND:
- FLASHOVER BURNERS AVAILABLE
- B⚡ BURNER LOCATION(S)
- FIREPLACE LOCATION(S)

FIG. 8

FIREFIGHTER TRAINING SYSTEM WITH THERMAL AGENT DETECTION

BACKGROUND OF THE INVENTION

Field of the Invention

The subject invention relates generally to fire simulation systems for training municipal, military, and other firefighter trainees as to the preferred procedures for suppressing and ultimately extinguishing fires. More particularly, the invention relates to a firefighter training system which uses thermal mass sensors to detect and evaluate application of a fire extinguishing agent.

Description of the Related Art

Conventional firefighter training practices typically provide for the combustion of flammable materials, such as wood, straw, and other organic and inorganic materials, which are to be extinguished by the trainee upon the application thereon of sufficient quantities of an appropriate extinguishing agent. The extinguishing agent that is most commonly utilized is water, due principally to its availability, cost and widespread usage as a fire extinguishing material. However, these conventional training practices have come under scrutiny in recent years as a result of the relatively high injury rate, adverse environmental impact, and limited training effectiveness and trainee throughput that is associated with such practices. For example, the National Fire Protection Association (NFPA) reports that in the United States alone, nearly 6,000 training-related injuries were sustained by firefighters in 1988. Nevertheless, live fire training is a crucial and necessary component of firefighter training, for it most closely represents the overall environment a firefighter is likely to encounter during a genuine fire emergency. Unfortunately, conventional live fires that are set for the purpose of firefighter trainee education suffer from many of the very same hazards that are associated with genuine fire emergencies—unpredictability of fire propagation and its response to trainee action. As a consequence of these characteristics, it is often times necessary for the trainee supervisors to themselves suppress the live fire prior to rendering perhaps life-saving assistance to a fallen trainee. Furthermore, because the very nature of a conventional live fire is unpredictability, it is not possible to accurately and readily reproduce a desired fire condition for a succession of firefighter trainees.

In an effort to address the foregoing deficiencies in firefighter training, live fire simulator systems have been implemented since the early 1970's which provide for, among other features, the substitution of various controllable arrangements of propane and natural gas-operable burners located within dedicated "burn rooms" for the prior practice of igniting various flammable props (i.e., wood or straw bundles) or even buildings to be razed. Illustrative of the newer generation of live firefighter training simulators is that disclosed in U.S. Pat. No. 4,303,396 and assigned to the United States of America as represented by the Secretary of the Navy. The simulator disclosed in this referenced patent, which is hereby incorporated by reference, provides a plurality of chambers, each of which can be provided with a fire from a fuel burner that is representative of a variety of different types of fires. This simulator is useful in educating firefighter trainees as to some general principles of fire extinguishment; however, it does not require the trainee to properly apply extinguishing agent so as to effectively cool the simulated burning material. In actual fire incidents, proper cooling is the primary means of extinguishment utilized in structural fire fighting, for failure to fully cool burning material often results in a fire reflash. As used herein, the term "reflash" refers to the spontaneous regeneration of a combustion process due to the latent or residual heat contained in the combustion materials. For example, the flames of a fire in a piece of furniture may be temporarily extinguished using a spray of water, but may then "reflash" at a later time as can occur, for example, after a prolonged period of smoldering. Smoldering arises from the re-radiation of thermal energy from the interior of an object that has been only superficially cooled, as by a spray of water. The thermal energy is conveyed to the exterior surface of the object where, if of a quantity sufficient to initiate combustion, results in spontaneous re-combustion of the object. The extent to which an object can absorb and emit thermal energy is characterized by its "thermal mass".

Because reflash can have such a profound impact on the health, safety and performance of firefighters and the lives and property to which their efforts are directed toward saving, it is desirable to properly educate firefighters as to the fire extinguishing techniques which are successful in preventing reflash from occurring. One commonly used method for inhibiting the occurrence of reflash is to apply a fire extinguishing agent such as water to the burning object for a period of time following fire extinguishment, thereby cooling the combustible material. However, in the absence of knowledge and training as to the duration of time of such spraying that is required to prevent reflash from occurring in various materials, lives and property cannot be adequately protected. Further, time spent in oversaturating combustible material can have adverse consequences for firefighters and property in other fire sites, as undue time spent with one fire prevents firefighters from combating fires elsewhere.

Efforts to incorporate reflash precursor simulation in prior live fire simulators have not been very realistic. For example, an attempt has been made to provide reflash prevention training by monitoring generally the amount of water which is applied to the fire. In instances where insufficient quantities of water are used, the fire is made to regenerate after initial extinguishment. Unfortunately, only the quantity of water that is applied to the fire is monitored; Other relevant factors, such as the spraying technique and the identity of the specific area sprayed, are not monitored.

In view of the foregoing limitations of the prior art, it is an object of the present invention to provide an improved method and system for detection of agent application that measures the degree of cooling achieved by the trainee's application of water or low expansion foam.

A further object of the present invention is to simulate reflash arising from a variety of different fire types and occurring when a variety of different extinguishing agents, such as water and low expansion foam, are in use.

Yet another object of the present invention is to provide reflash simulation for firefighter training which is responsive to a range of variable user-selectable parameters.

These and other objects and advantages will become apparent from a reading of the following detailed description of the preferred embodiment.

SUMMARY OF THE INVENTION

The education of firefighter trainees as to the proper techniques for combating live fires is a common objective of all firefighter training regimens. Conventional regimens typically include, among other aspects, identification of the type of fire by class (A, B, or C), selection of an appropriate extinguishing agent in view of the class of fire, and agent application techniques. Fires develop and spread because the combustion temperature for the materials has been attained or exceeded. Yet, firefighter training efforts to date have not been able to provide adequate temperature feedback data from the combustible materials to the trainees. Instead, training efforts have allowed for inferences of material cooling in accordance with such factors as the quantity of extinguishing agent that is collected in the vicinity of the fire. Training on the basis of such inferences is clearly inadequate. For this reason, the disclosed firefighter training system uses temperature data from the vicinity of a simulated fire to better educate and prepare firefighter trainees for fire emergencies of the type they are likely to encounter in genuine fire emergencies.

In one aspect of the invention, a control system is provided for use with a firefighter trainer having a main burner that is mounted within a burn room. The burner can be positioned behind or underneath a generally open grating and is operable to emit flames in the vicinity of simulations or mock-ups of various combustible materials such as furnishings and the like. The simulation control system includes a temperature sensor such as a thermocouple that is mounted within a thermal mass such as a block of a thermally conductive metal. The thermal mass is positioned adjacent to the main burner as can be accomplished by, for example, mounting within the grating or along a side of the mock-up so as to be exposed to the heat, and optimally the flames, of the burner. Alternatively, the thermal mass can be positioned inside of the mock-up to provide temperature data of the mock-up interior, thereby further simulating the conditions associated with genuine fire emergencies. The simulation control system is operable to monitor the temperature of the metal block and to re-generate, preferably in a continuous manner, fuel delivery and fuel ignition signal output to the main burner in instances where the temperature of the thermal mass is above a predetermined user-selected temperature. The simulation control system can include, for example, a valve assembly such as a motorized linear valve or other suitable valve arrangement, for providing variable control of fuel delivery to the main burner in accordance with signal input received from an automated processing control unit.

Another aspect of the simulation control system provides for the monitoring of at least one firefighter trainer operational parameter such as temperature and the generation from the control system of a reflash enablement signal after the monitored operational parameter has attained or exceeded a pre-selected threshold value. Preferably, the threshold value is operator selectable from a prescribed value range and can be applied as an input to the control system.

In a further aspect of the invention, a reflash enablement signal can be provided to a selectively operable reflash actuation switch to provide supervisory personnel on-site at the burn room with discretionary control over operation of the reflash simulation once the prerequisites for reflash have been attained.

BRIEF DESCRIPTION OF THE DRAWINGS

The foregoing and other objects and advantages will become more fully comprehended upon a reading of the following detailed description in conjunction with the accompanying drawings, which:

FIG. 8 is an illustrative sample of an operator console screen display that can be generated incident to the practice of the subject invention.

DETAILED DESCRIPTION OF THE PREFERRED EMBODIMENTS

Figure 1:
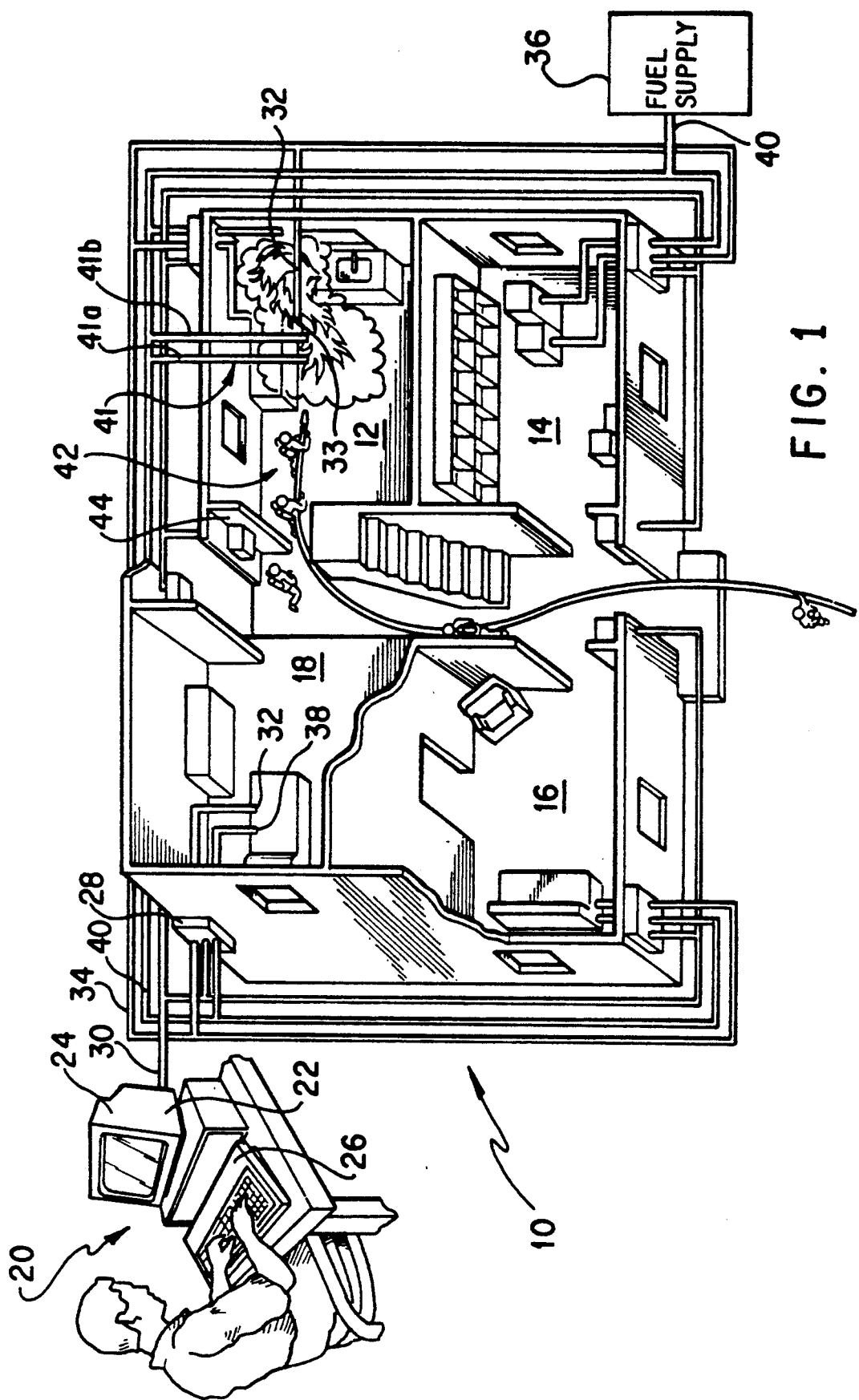
FIG. 1 is a schematic overhead view of a multi-compartmented firefighter trainer in accordance with the subject invention.

With reference to the drawings, wherein like reference characters represent corresponding parts throughout the various views, and with particular reference to FIG. 1, there is depicted a multi-compartmented firefighter trainer in accordance with the principles of the subject invention, designated generally by reference character 10. The trainer is comprised generally of a plurality of compartments or chambers 12, 14 16 and 18, each of which is independently operable and controllable in the manner described below by a master processing unit 20 which may comprise a personal computer, workstation, or the like. However, it is to be understood that the principles of the subject invention are equally applicable to firefighter trainers having only a single compartment or "burn room".

As shown in the drawing, the master processing unit 20 comprises a central unit 22 which includes a central processing unit (CPU) and a disk drive or other suitable memory accession device, a display screen 24 such as a CRT, and a suitable data input device 26 such as a keyboard and/or manual input device (e.g., "mouse"). The master processing unit 20 can be positioned remote from the compartments 12, 14, 16 and 18 and is operable to communicate in a "master/slave" relationship in the manner described below, as indicated by control line 30, with a local automated processing unit 28 that is preferably associated with one or more of the compartments in which a fire simulation is to be conducted. The local processing unit 28 provides control signal inputs to the various devices such as fuel inlet valves, smoke generators and emergency fire suppression and ventilation apparatus described below. Data regarding the operability and/or performance of the apparatus controlled by the local processing unit 28 is conveyed to the master processing unit 20 along the control line 30. Additionally, data sensed by various temperature sensors, such as temperature sensor 32a (FIG. 2) mounted near the compartment ceiling and sensor 32b positioned at a user-selected height (typically from about three feet to about five feet) above the compartment floor so as to monitor the temperature to which trainees are exposed, is communicated to the local processing unit 28 along sensor data lines 34a and 34b for processing, after which the processed sensor data can be communicated to the master processor 20 for display to the operator. Ceiling temperature data can be collected to demonstrate to the trainees the effectiveness of indirect attacks on the fire, as hot gases can collect adjacent to the ceiling. Use of ceiling temperature data in the agent detection system of the present invention will be described in greater detail below.

Fuel such as propane or natural gas is housed within a suitable storage tank 36 and is supplied to main gas burner units 38 within the compartments through fuel supply lines 40. Signal inputs are received at the local processing units 28 for opening the appropriate fuel control valves associated with a given burner in the compartment 12, 14, 16 or 18 in which a training exercise is to be conducted to provide for fuel delivery to the one or more burner units in the compartment. Fuel can also be supplied to the overhead flashover burner unit 41 in a similar manner upon the occurrence of pre-established criteria applied as inputs through the data input device 26, as described in co-pending U.S. patent application Ser. No. 703,101, entitled "Flashover Simulation For Firefighter Training", which was filed on May 22, 1991 and has been assigned to AAI Corporation, the assignee of the present invention. The flashover burner unit generally comprises two elongated, cylindrical burners 41a and 41b that are positioned in spaced-apart relation with one another so as to produce, upon burner ignition, a flame spread that is generally parallel to the ceiling.

As indicated in the drawing, the preferred embodiment of the subject invention permits a firefighter crew, indicated in the drawing generally by reference character 42, to advance through the trainer 10 to a specific one or more of the trainer compartments, such as compartment 12, to combat a live fire that has been generated therein by the main burner assembly 38 in a manner well known in the art. Supervisory personnel are preferably present to oversee the progress of the training scenario and can be located at various positions within the compartment, such as behind one or more optional observation or fire walls 44.

Figure 2:
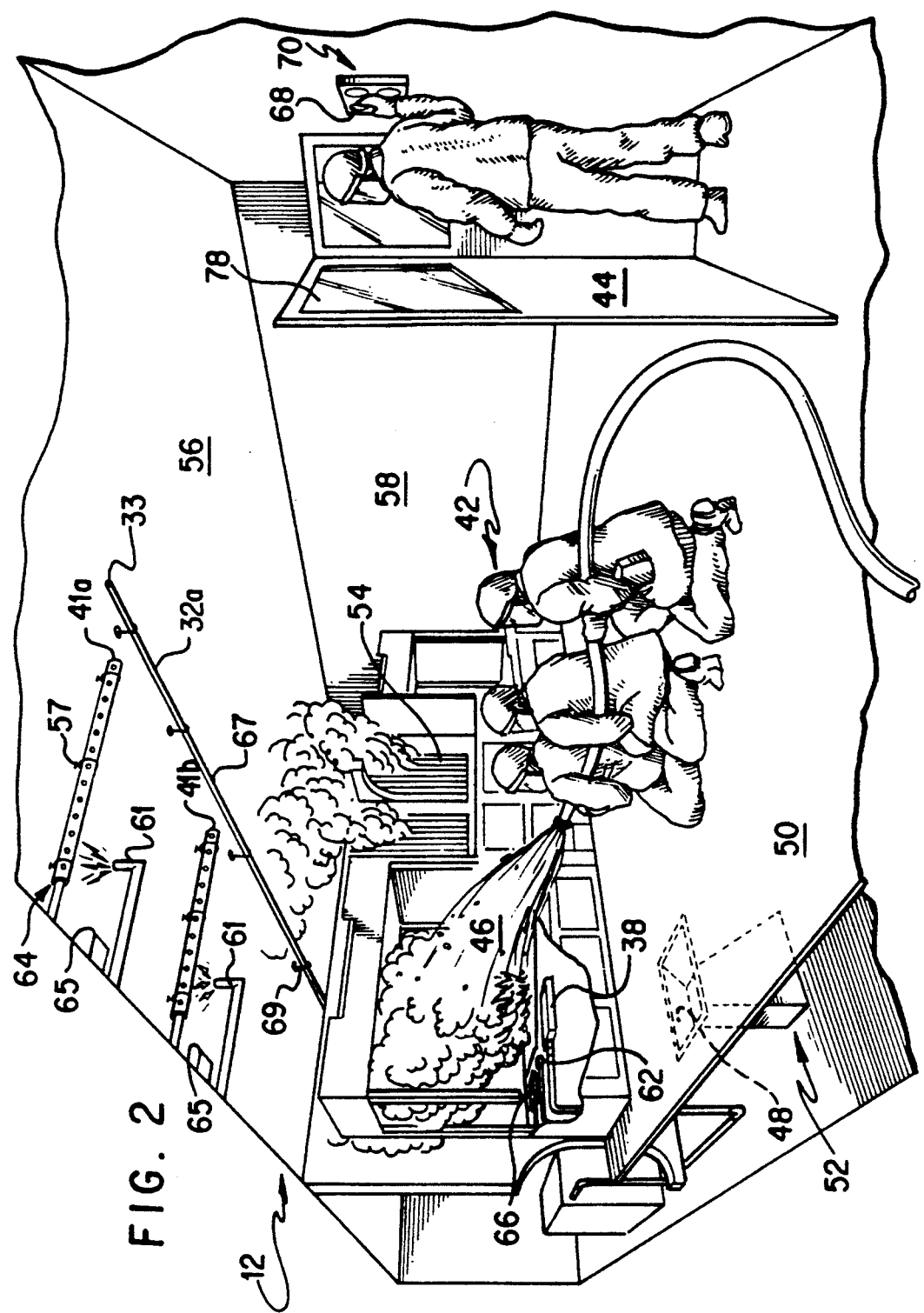
FIG. 2 is a perspective side view illustrating details of a portion of one of the compartments of the trainer depicted in FIG. 1.
Figure 3A:
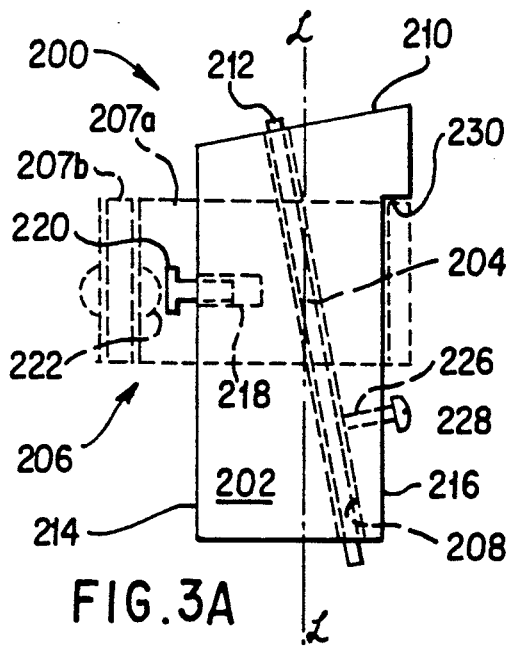
FIG. 3A is a sectional side view of the thermal mass assembly of the subject invention mounted within a burner grating.
Figure 3B:
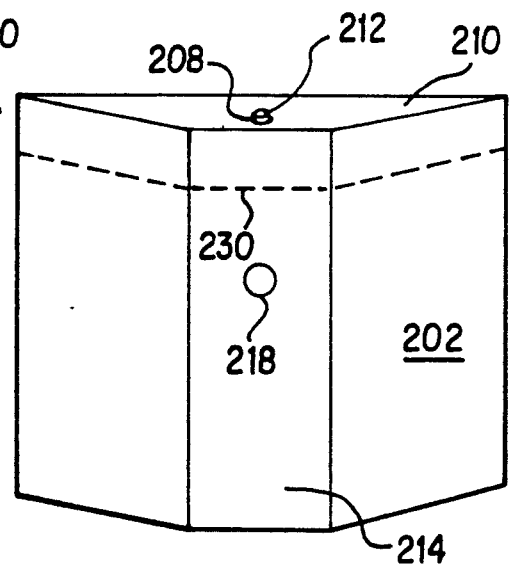
FIG. 3B is a front prospective view of the thermal mass assembly of the subject invention.
Figure 4:
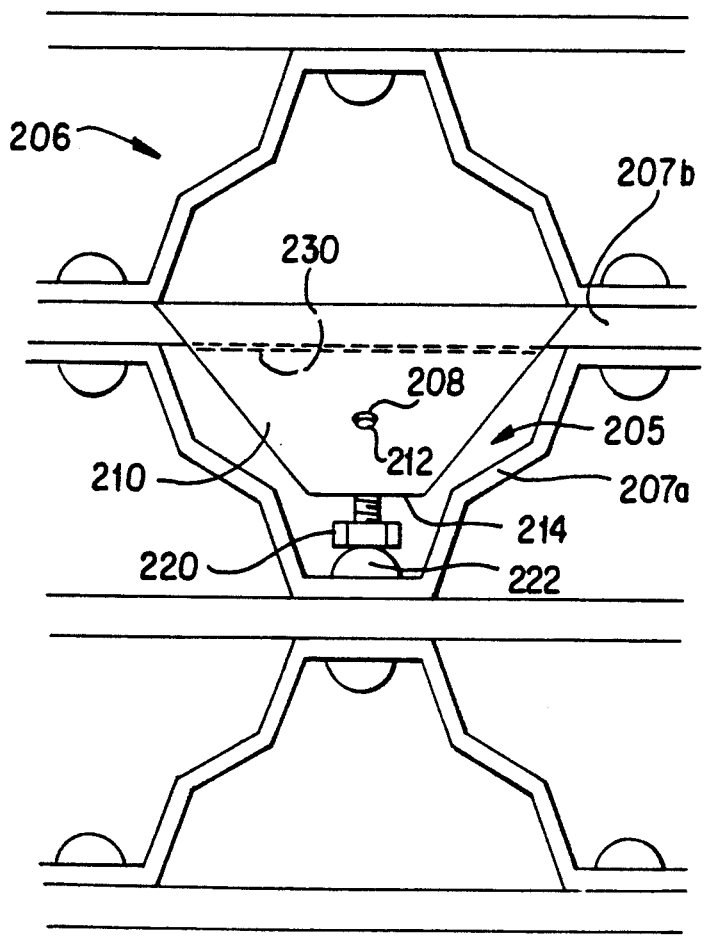
FIG. 4 is an overhead view of the device depicted in FIG. 3A.

Further details of the subject invention are depicted in FIG. 2, in which a firefighter crew 42 is shown applying an extinguishing agent such as water, foam, powder or gaseous $CO_2$ to a fire at the main burner assembly 38. However, water and simulated low expansion foams such as Calsoft L-40 manufactured by Pilot Chemical of Santa Fe Springs, Calif. are preferred extinguishing agents for use in the present invention due to their respective, relatively high heat absorbing properties. The fire at the burner 38 can optionally be controlled to simulate various types of fires such as wood, chemical, electrical and grease fires by controlling, for example, flame height and flame "responsiveness" to the applied extinguishing agent. The extinguishing agent 46 can optionally be collected at a funnel 48 formed in the floor grating 50 for removal from the chamber. Obscuration of the trainees, vision in a manner likely to be encountered in a genuine fire emergency can optionally be provided by suitable smoke generating apparatus (not shown), such as that described in co-pending U.S. patent application Ser. No. 707,868, entitled "Method and Apparatus for Controllably Generating Simulated Smoke", which was filed on May 31, 1991 and assigned to AAI Corp., the assignee of the subject invention, that are capable of producing simulated smoke through inlet vents 54.

The flashover burners 41 are positioned adjacent to the compartment ceiling 56, preferably at a height above the heads of the firefighter personnel to be received within the trainer compartment. The burners can be suspended from the ceiling by suitable brackets 57 or can be arranged so as to extend from one of the compartment sidewalls 58 and are ignitable by spark ignitors 61 or a pilot burner that are positioned adjacent to an inlet end 64 of each burner. Ultraviolet sensors 65 monitor the emissions of the ignitors and generate a signal that is indicative of sensor operation. A similar arrangement of ignitors 62 and ignitor sensors 66 is provided at the main burner assembly 38. The temperature sensor 32a that is positioned adjacent to the ceiling provides an indication of the temperature of the air and other gases that collect at the ceiling during a fire. The sensor 32a is preferably in the form of a thermocouple that is operable to provide variable signal output in accordance with the temperature sensed at the thermocouple tip 33.

As noted previously, reflash occurs when the thermal mass of the material that is exposed to the fire attains its combustion temperature, which will vary in accordance with the composition of the combustion material (wood, chemicals, and so on). The temperature of the material that has been combusted in a fire is simulated in the present invention by a thermal mass assembly, denoted generally by reference character 200 in FIGS. 3A through 5. The thermal mass assembly is comprised of a heat conductive block 202 through which extends a temperature sensor 204 such as a thermocouple. Preferred materials for the block 202 include 306, 314 and Inconnel stainless steel alloys due to their respective rust resistance and ability to withstand the extreme thermal stress resulting from exposure to burner flames and the cooling effect of applied extinguishing agents. The thermocouple 204 optimally is provided with an Inconnel sheath and is of the type that is adapted for use in high temperature environments of up to about 1900° F. A suitable thermocouple is the model K-33072G-10A-06 manufactured by Pyromation, Inc. of Ft. Wayne, Ind.

Figure 5:
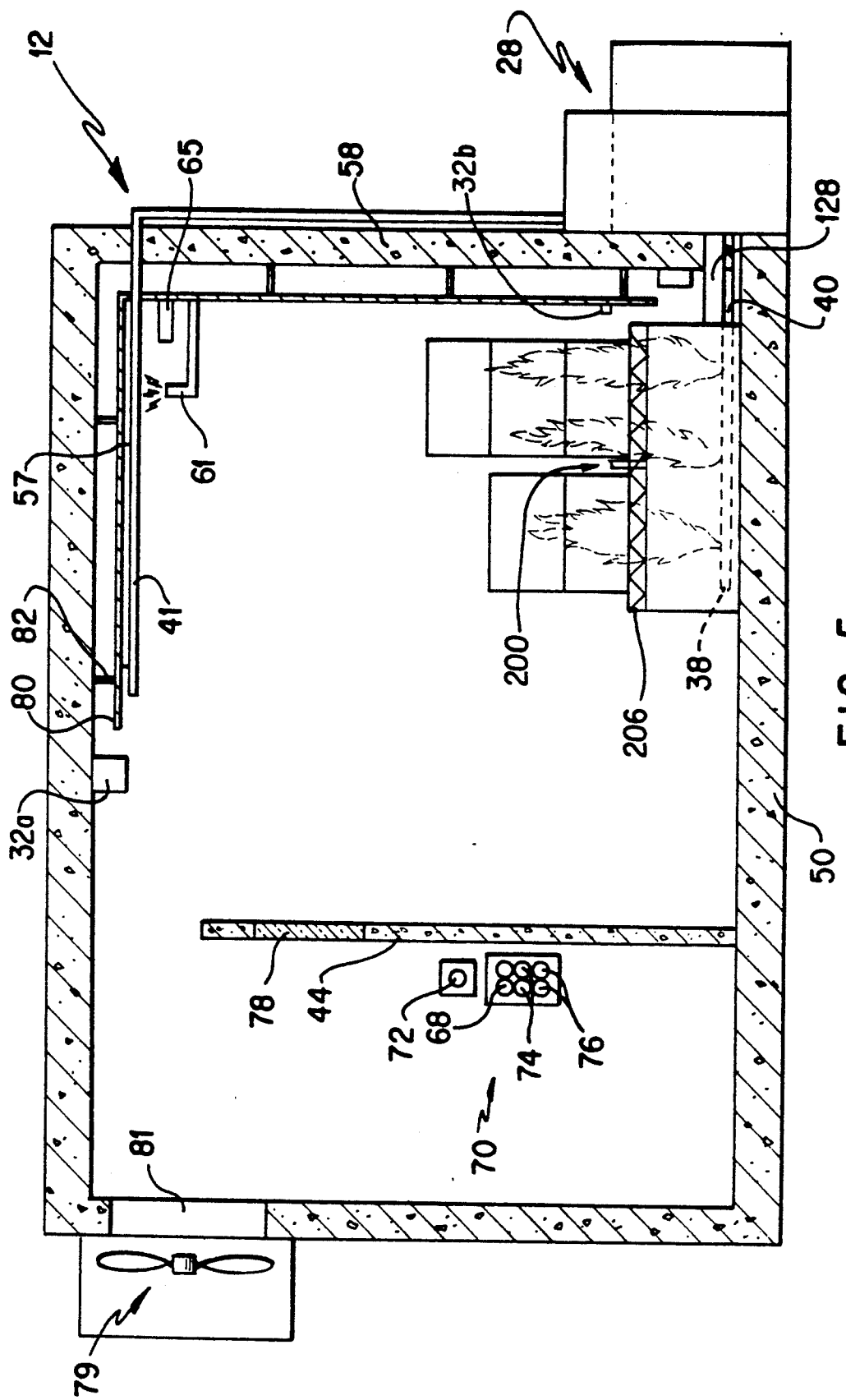
FIG. 5 is a sectional side view of an illustrative compartment of a firefighter trainer in accordance with the subject invention.

In the drawing figures, the thermal mass assembly 200 is depicted as being configured to be received within the interstices 205 of a metal grating 206 so that it is exposed to the flames generated by the adjacent burner assembly 38 (FIGS. 2 and 5). This arrangement also positions the assembly 200 in direct heat conductive relationship with the grating. Preferably, the block 202 is provided with a configuration that is generally analogous to that of the interstice 205 defined by the grating reticuline and bearing bars 207a and 207b, respectively; however, it is to be appreciated that the block 202 can be provided with a variety of alternative configurations in accordance with its intended use. For example, it can be configured as a generally planar member for securement by any of a variety of suitable coupling means to the side of a mock-up (prop) or other representation of a combustible object, or as a generally rectilinear or spherical member for mounting within the interior of the prop in instances where interior temperature data is desired.

The temperature sensor 204 is received within an aperture 208 that is angularly inclined with respect to the longitudinal axis L of the block so that the aperture bore is optimally perpendicular to the plane of the top surface 210 of the block 202 in the vicinity of the sensor 204. However, the range of inclination angles can vary in accordance with the geometry of the grating or other structure with which the thermal mass assembly is to be used. The tip 212 of the thermocouple, where temperature change is sensed, optimally protrudes beyond the top surface 210 of the block 202 a distance that is approximately equal to the radius of tip curvature in order to more precisely detect the cessation of fire extinguishing agent application. The top surface 210 of the block is preferably inclined to facilitate run-off of the fire extinguishing medium that is applied by firefighter personnel to the fire, thereby minimizing the occurrence of pooling of the extinguishing agent adjacent to the temperature sensor and the indication of artificially diminished temperature readings resulting therefrom. Although the top surface 210 is illustrated as having a single, uniform slope, it can alternatively be provided with a compound slope (i.e., two or more angularly inclined segments) or a curved or rounded contour to provide the desired extent of agent run-off.

The front and back sides 214 and 216 of the block are arranged generally parallel to one another; however, this relationship can vary (i.e., become non-parallel) in accordance with such design constraints as the configuration of the grating interstice 205 into which the block 202 is to be received. An aperture 218 extends inwardly from the front side 214 and is preferably provided with a threaded interior bore to receive a complementary-threaded fastener 220, which is adjustably positionable within the aperture 218 so as to protrude outwardly therefrom to engage a grating portion such as a rivet 222 for securing the block 202 to the grating. The back side 216 of the block 202 is provided with a threaded aperture 226 for receiving a complementary-threaded fastener 228 which is provided to fix the longitudinal position of the thermocouple 204 within the aperture 208. The back side 216 of the block extends rearwardly at the upper portion thereof to form a ledge 230 which is dimensioned to extend over the grating bearing bar 207b, thereby inhibiting passage of the block 202 beyond a predetermined extent through the grating interstice. As noted previously, the position of the block 202 within the interstice 205 can be fixed by backing the fastener 220 outwardly from the correspondingly-dimensioned aperture so as to frictionally engage the grating rivet 222. As a consequence of the foregoing structure, the thermal mass assembly is operable to receive thermal energy from the grating 206 by way of conduction, convection and radiation to provide an indication of the grating and overlying prop temperature during the course of the simulation. As will be explained in greater detail below, the conditions which give rise to reflash enablement can be prevented by applying water or simulated foam to the thermal mass assembly 200 to cool it to a temperature (as sensed by the thermocouple 204) to a temperature below the user-selected reflash threshold.

With reference to FIGS. 2 and 5, the various control switches, such as emergency off 72, pause on/off 74 and smoke on/off 76, are preferably provided with unique coloring and/or backlighting to facilitate their visualization throughout operation of the fire simulation exercises. A viewing port or window 78 can be provided in the firewall 44 to permit the personnel stationed behind the firewall an unobstructed view of the progress of the firefighter training scenario. Supervisory personnel are preferably present at the control panel 70 throughout the training exercise to oversee all activities within the compartment 12 and to exercise supervisory control over the conduct and progress of the training exercise.

An insulative liner 80 (FIG. 5) overlies the respective portions of the compartment ceiling and sidewall which are likely to receive extinguishing agent so as to protect the compartment ceiling and sidewalls from the deleterious affects of repeated, sudden and extreme temperature changes. The liner can be formed from mild steel or weathering steel such as "CorTen" steel, manufactured by USX Corp. of Pittsburgh, Pa., and is removably mounted to the ceiling and sidewalls by conventional brackets 82. Smoke and heat can be exhausted from the compartment by one or more exhaust fans 79, which are operable to draw these trainer byproducts through an associated aperture 81 formed in a sidewall of the compartment.

Figure 6:
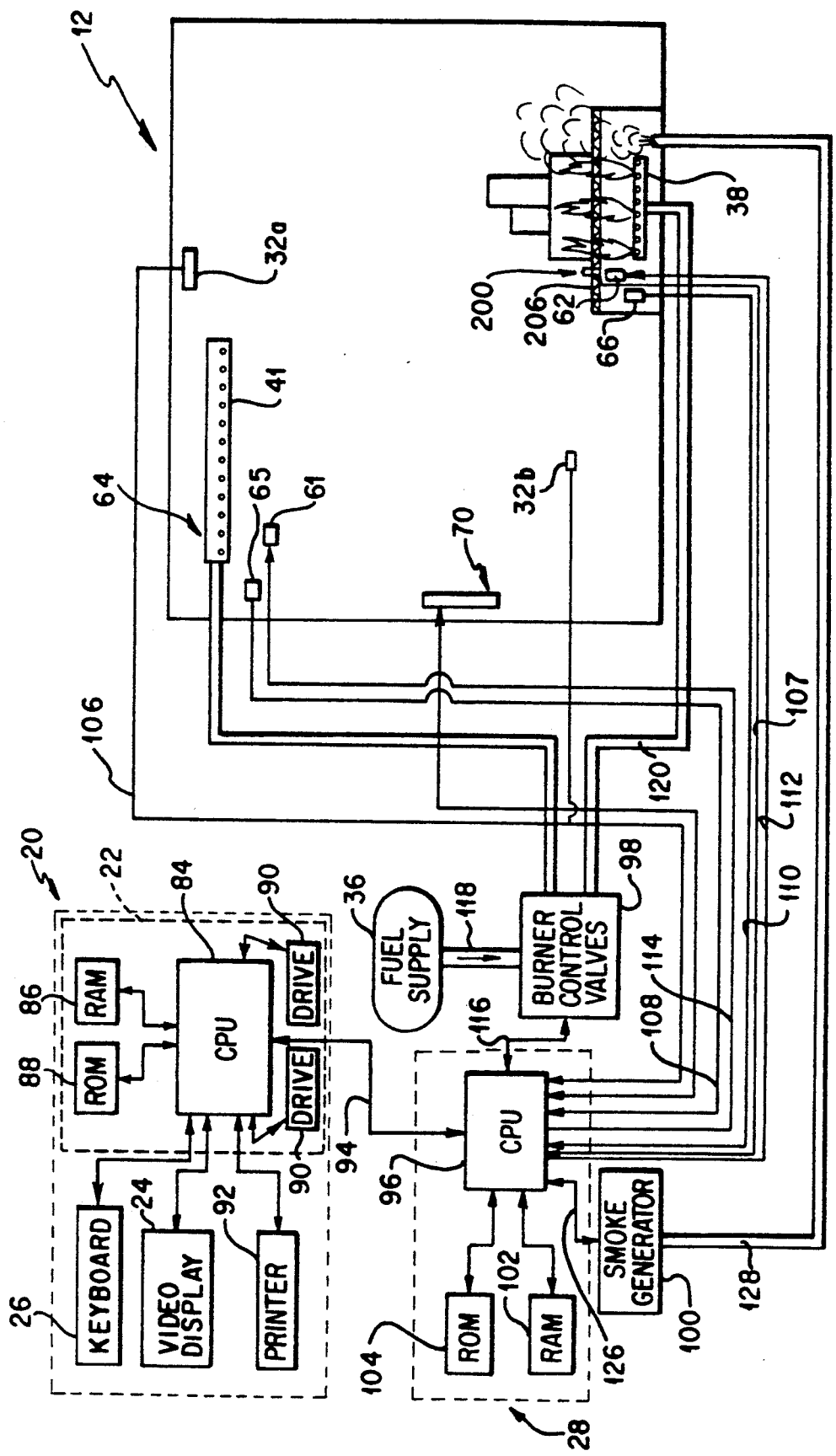
FIG. 6 is a sectional schematic side view schematic diagram of a firefighter trainer compartment and control system therefor in accordance with the subject invention.

Details of the electromechanical control apparatus for agent detection and the reflash simulation of the subject invention are illustrated in FIG. 6. With reference to the drawing, the master data processing unit 20 is in the form of a personal computer or workstation. Operation of the processing unit 20 is controlled by a central processing unit (CPU) 84, such as the model SB286SC marketed by Industrial Computer Source, Inc. of San Diego, Calif. A random access memory (RAM) 86 is electrically connected to the CPU and stores OSS (operator system software) software and provides working memory for the CPU. A read-only memory (ROM) 88 is also provided which stores various programs that are needed for input/output, power-up, self-test diagnostics, and booting procedures for the CPU 84. One or more disk drives 90 can be provided to interface with the CPU 84. The above-referenced video monitor 24 (FIG. 1) and data input apparatus, such as the keyboard and/or mouse 26, are provided to permit human operator interaction with the CPU 84. A printer 92 can optionally be connected to the CPU 84 to provide a hard copy of the data related to agent application, such as graphics and/or tabular data relating thermocouple temperature as a function of time, and flame height at the main burner assembly 38 as a function of time. Alternatively, such data can be stored in RAM 86 for subsequent recall and display to the trainee(s) at one or more console monitors 24.

The master processing unit 20 is coupled to the local processing unit 28 at the facility (also known as a "burn building") which houses the one or more trainer compartments by way of a bidirectional data, address and control bus 94. Preferably, a single, dedicated local processing unit 28 having all of the features specified below is provided adjacent to one or more of the plurality of trainer compartments with a data bus 94 extending between the respective processors 84 and 96. As is the case with the master processing unit 20, the local processing unit 28 includes suitable programming and hardware interfaces for communicating with and controlling various hardware devices. These devices include the fuel burner control valves 98, ignitor control devices, and smoke generator 100 that are associated with the firefighter training simulator of the subject invention, as well as A/D converter apparatus that allows the processor to receive and interpret signal inputs received from the respective temperature sensors 32 and 204. Preferably, outputs from the ignitors 61 and 62 and UV sensors 65 and 66 of each compartment are in the form of digital data for direct transmission to the CPU 96.

The CPU 96 of the local processor unit is connected to the various sensor and hardware devices associated with each simulator compartment, such as the compartment 12 illustrated in FIG. 6. For example, the CPU 96 receives temperature sensor input (following processing by appropriate A/D converter apparatus) from the thermocouples 32 and 204 along data lines 106 and 107, respectively. Data from the main burner and flashover UV sensors 65 and 66 relating, respectively, to operation of the main burner and flashover ignitors 61 and 62, is transmitted to the CPU 96 along appropriate data lines, indicated schematically by lines 108 and 110, whereas ignition signal input to the corresponding ignitors are transmitted along communication lines 112 and 114. Fuel is conveyed under pressure from tank 36 to the main burner unit 38 and optionally to the flashover burner unit 41, upon receipt by the burner control valve system 98 of appropriate signal commands transmitted along communication line 116. The valve control system includes a suitable remotely controllable valve assembly, such as the series 1800-MLV motorized linear valve manufactured by Ben Metzger, Inc. of Perry, Ohio, that is mounted within the fuel flow path to the respective main and flashover burner unit 38 and 41. Upon receipt of appropriate signal input from the CPU 96, the valve control system 98 is operable to bias the fuel control valves between a closed position and an open position so as to allow for precise metering of fuel under pressure from the tank 36 (through conduit 118) and into a corresponding one of the burner fuel supply lines 120 and 122 for delivery to the respective burner units. Manual control inputs (i.e., for pause on/off, smoke on/off, and so on) to the local control panel 70 is communicated between the CPU 96 and local control panel along communication line 124. CPU 96 control of the smoke generator 100 is implemented along communication line 126. Upon receipt of an activation signal input from the CPU 96, smoke, which is preferably of the simulated, non-toxic variety such as that produced by the smoke generator disclosed in commonly-assigned U.S. patent application Ser. No. 707,868 referenced above, the disclosure of which is expressly incorporated by reference, is conveyed along conduit 128 to the main burner assembly 38 or any other suitable outlet within the trainer compartment for the purpose of further enhancing the realism of the fire simulation. The CPU 96 can be operated in a manner well known to persons of ordinary skill in the art to control any of a variety of other simulator components, such as compartment ventilation, lighting, and other hardware. Signal data relating generally to the enablement, status and control of the foregoing hardware components discussed above is exchanged between the local and main processing systems along the data bus 94, thereby minimizing the complexity of communication and control exchanged between these two processing systems. The foregoing communication and control hierarchy is further advantageous in situations where the master processing unit 20, for any of a variety of reasons, is not located on-site at the burn building.

Figure 7A:
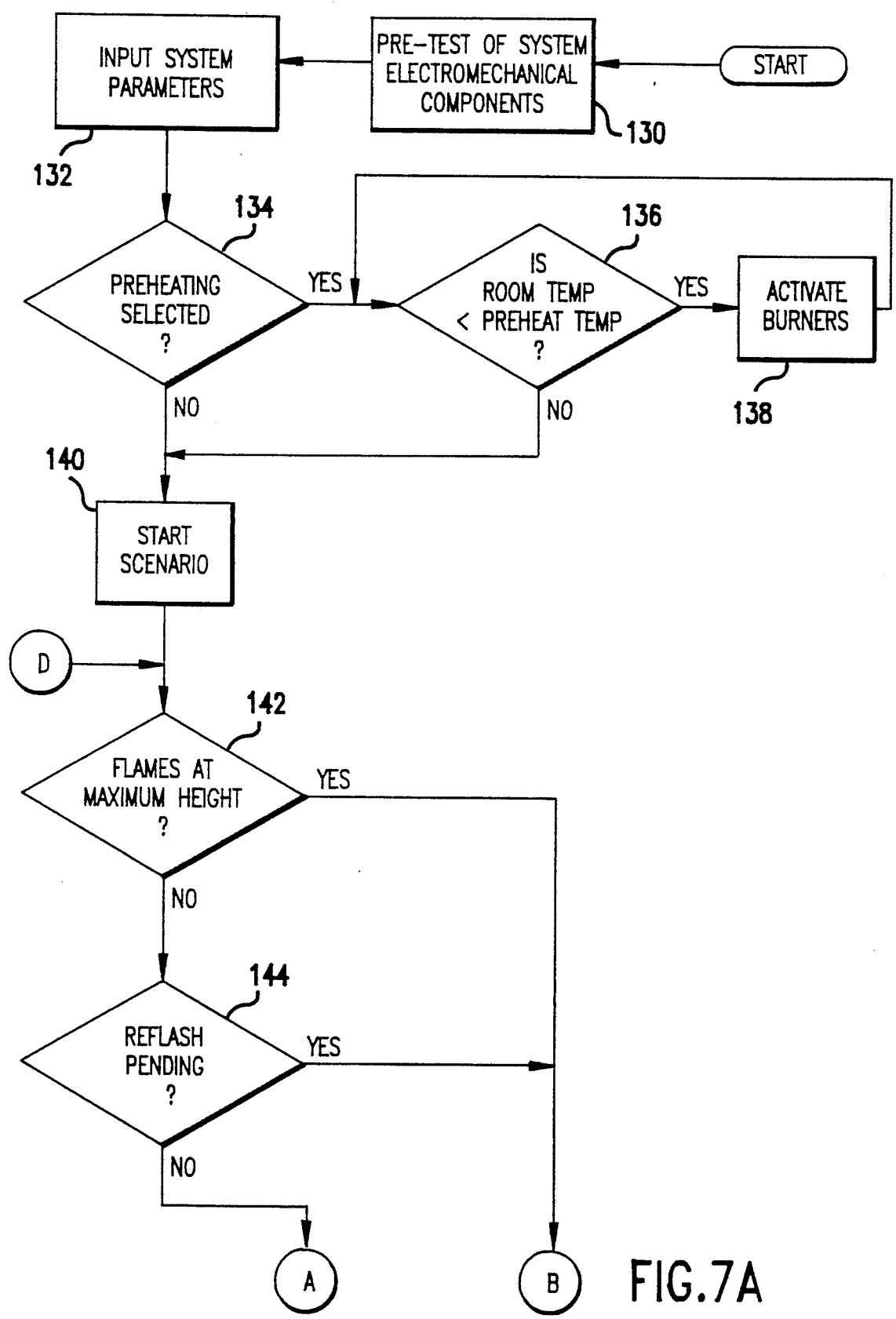
FIG. 7A through 7C are flow diagrams of the reflash simulation control logic for the firefighter trainer in accordance with the subject invention.
Figure 7B:
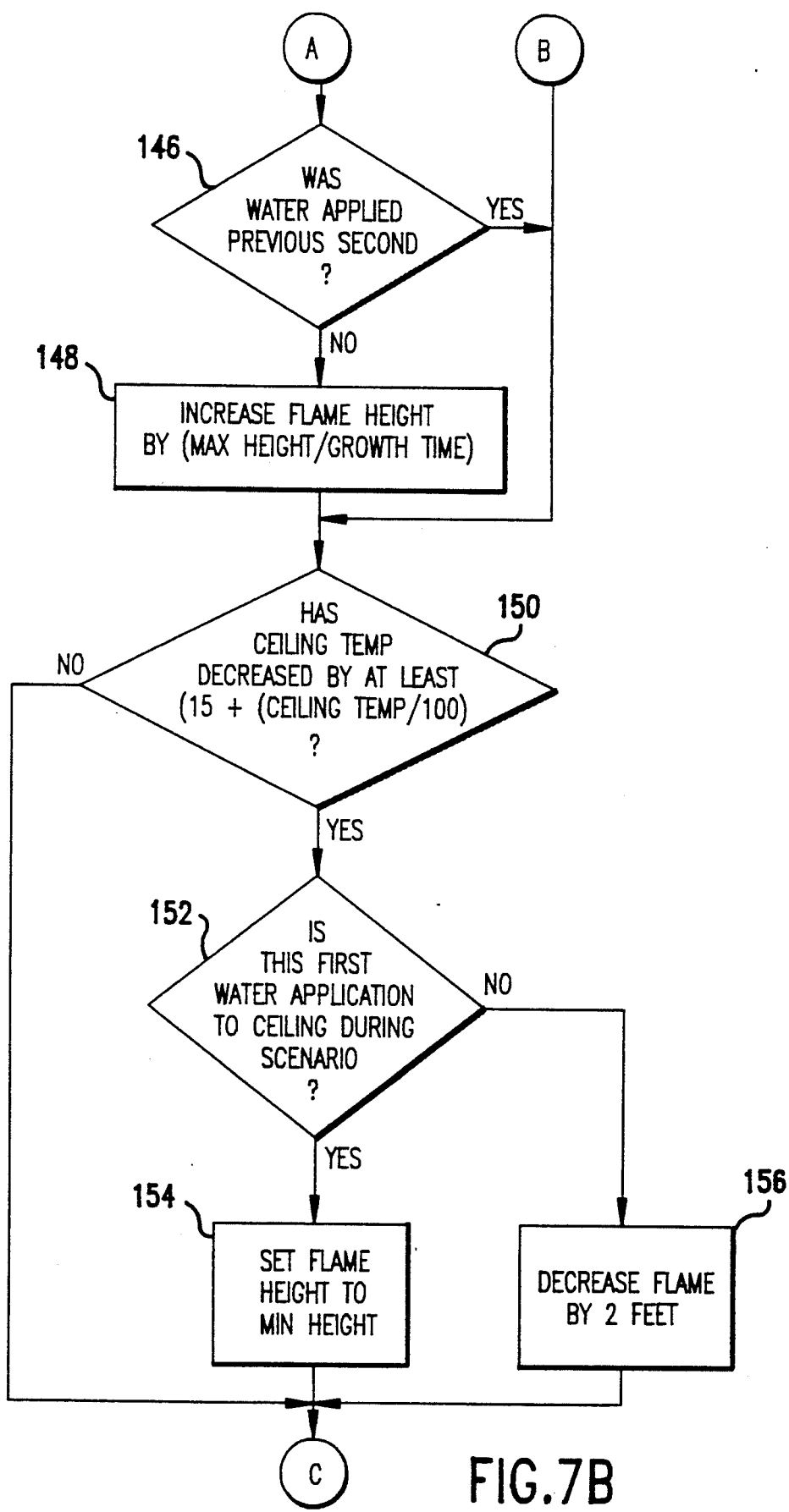
Figure 7C:
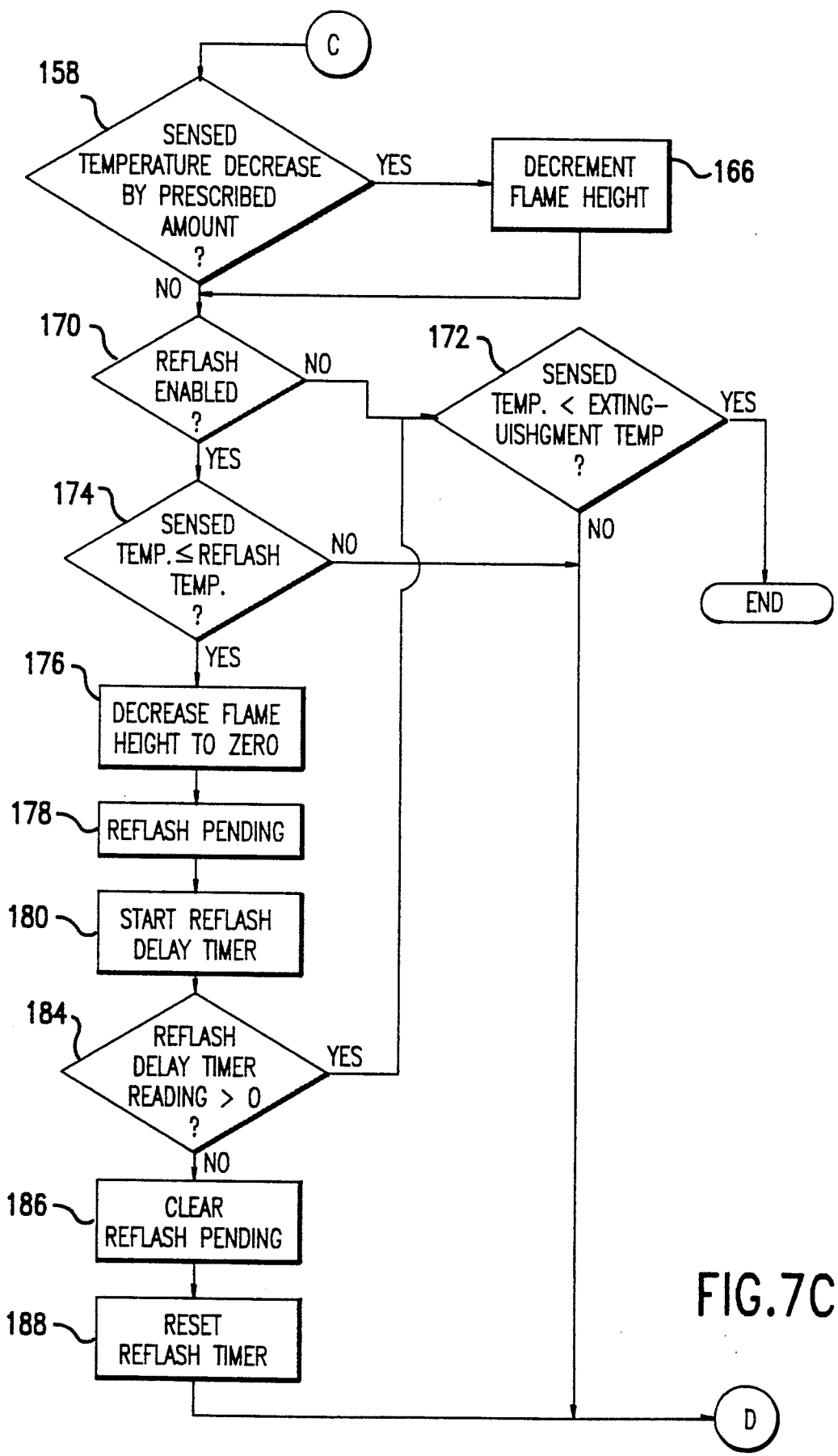

Details of the program control for agent detection and reflash simulation of the subject invention are set forth in the flow diagram of FIGS. 7A through 7C. In general, the agent sensing system of the present invention is operable to detect the application of extinguishing agent to the thermal mass assembly 200 by sensing a reduction in temperature of the exposed tip 212 of the thermocouple temperature sensor 204 that arises from contact with the extinguishing agent. This reduction in sensed temperature effects a change in signal output from the thermocouple to the local processing unit 28 which, in response to the sensed temperature drop, causes a decrease in burner flame height in the manner described below. If the firefighter trainee continues with application of the extinguishing agent so as to further reduce the temperature of the prop and associated thermal mass assembly 200 to a user-selected fire extinguishment temperature, the burner flames will be extinguished; otherwise, the flames will continue at a prescribed minimum level. A reflash temperature can optionally be selected to demonstrate fire reflash. In instances where extinguishing agent application is not continued to further cool the prop and thermal mass assembly to a temperature sufficiently below the fire reflash temperature, heat from the grating 206 and block 202 of the thermal mass assembly will be conducted to the thermocouple 204, causing an increase in thermocouple sensed temperature and an appropriate modification in thermocouple signal output to the local processor 28. If the sensed thermocouple temperature rises to the reflash temperature selected at the outset of the training scenario, the processor 28 is operable in response thereto to re-generate the burner flames and increase their height in the absence of renewed extinguishing agent application.

Prior to the implementation of the training exercise, the CPU 84 commands the CPU 96 to initiate a test of the fuel pressure and fuel control valves 98 and various other electromechanical components of the system in order to confirm their operability, as indicated by block 130. This test is accomplished by the CPU 84 accessing of appropriate program data stored in RAM 86, as described above, resulting in generation of an appropriate input signal to the CPU 96 of the local processing unit 28 on-site at the trainer compartment at which the firefighter training exercise is to be undertaken. The test is implemented upon accessing by the CPU 96 of test-related program data stored in RAM 102 in a manner known in the computer art, which effects signal output from the CPU 96 along communication line 116 to command the hardware at the control valve assembly 98 to undergo a prescribed regimen of openings, closings and system pressure checks. This pre-implementation test can further encompass test-firing of the respective burner ignitors 62 and 61 and the monitoring thereof by the UV sensors 66 and 65 associated with the respective ignitors by means of signals exchanged with the CPU 96 along the respective communication pathways, indicated schematically by lines 112 & 114 and 108 & 110. Upon satisfactory completion of the pre-implementation test procedures, the main processing unit 20 prompts the console operator, as indicated by block 132, for entry of the appropriate fire simulation parameters for the training exercise. In instances where flashover simulation is not to be provided, the apparatus related to the supplying and regulating of fuel to the flashover burners 41 can be disabled. An illustrative example of the operator console prompt and parameter selection menu is illustrated in FIG. 8. Preferably, simulation parameters include reflash enablement, reflash delay time, maximum flame height, reflash temperature, flame extinguishment temperature, compartment preheat temperature, and flame growth time. In a preferred aspect of the invention, the user selects a value for each parameter which is within the prescribed range indicated on the user screen. The parameters can be entered through the keyboard, mouse 26, or other suitable input device which provides for conveyance of the desired parameters to the CPU 84. An error message is generated in instances where entry is attempted of user inputs that are not within the prescribed parameter range.

Following entry of the respective training scenario parameters, the training scenario is initiated. In instances where compartment pre-heating has been selected (block 134), temperature data from compartment sensor 32b is received at the local CPU 96 and relayed to the main CPU 84 for comparison with the pre-selected temperature value (block 136) previously input into the system (block 132) to determine whether or not the compartment temperature exceeds the selected preheat temperature stored in RAM 86 of the main processing unit 20. System pre-heating is especially beneficial at the outset of trainer operation to warm the various temperature sensors and system hardware to an elevated base temperature, thereby increasing overall system responsiveness to temperature changes which occur during the training scenario, as well as to better simulate the heat environment of a live fire of the type that trainees can expect to encounter in a genuine fire emergency. In instances where the measured temperature value is less than that of the selected pre-heat temperature, the main burner assembly 38 is ignited (block 138) in the manner described above and the supply of fuel to the burner assembly is regulated in accordance with CPU 84 input to the valve assembly 98 through the CPU 96 to provide a burner flame of a magnitude (such as about 3 feet) that is sufficient to warm the training compartment to the desired temperature in a relatively short period of time. Once sensor output from the temperature sensor 32b indicates that the selected pre-heat temperature has been attained, the scenario can be started, as indicated by block 140.

Operation of the present invention in conjunction with a live fire training scenario permits for more realistic and precise temperature-based control of burner flame height throughout the scenario as opposed to the extinguishing agent volume-based control systems of the prior art. Accordingly, burner flame height diminishes in response to the application of an extinguishing agent such as water and increases in the absence of sufficient quantities of such agent or in instances where the agent has been improperly applied and therefore does not provide the requisite cooling to effect a reduction in flame height. In accordance with the present invention, flame height is preferably monitored at the CPU 84 on a regular periodic or substantially continuous basis in accordance with such related parameters as valve position in the fuel supply line to the burner assembly. It is to be understood from the following description that processing conducted at the CPU 84 on the basis of trainer compartment parameters such as flame height and temperature are conveyed to the CPU 84 through the local processing unit's CPU 96 and the bus line 94 extending between the local and main processing units 28 and 20, respectively, for processing thereby and the communication of processed signal output from CPU 84 to CPU 96 for appropriate communication with system hardware described below.

For control of burner flame height, several factors are considered. In instances where the burner flames have not yet attained their pre-selected maximum height (block 142), the CPU 84 is operable to determine whether reflash is pending, as indicated by decision block 144. Details of the criteria which give rise to the pendency of reflash will be described below. In instances where reflash is not pending, which is the case not only at the outset of the scenario but also typically throughout the training scenario up to fire extinguishment, temperature output from the temperature sensor 204 is received by the CPU 84 and processed to determine whether the temperature has decreased in the preceding interval of time, indicated by decision block 146. When temperature sensor 204 output is indicative of no such temperature diminution, the CPU is operable to increase burner flame height in accordance with the growth rate established at the outset of the scenario, as indicated by block 148. The CPU 84 is operable to determine (block 150) whether or not extinguishing agent has been applied to the ceiling of the trainer, as indicated by the characteristics of the signal output from the ceiling mounted temperature sensor 32a that is received by the CPU 84. In a preferred aspect of the invention, the ceiling temperature evaluation provides for a requisite temperature decrease as follows:

Temp. Drop $\geq 15°$ F. + (last measured ceiling temp./$100°$ F.)

Temperature decreases which satisfy this criteria are attributable in the training scenario to the proper application of extinguishing agent to the trainer compartment ceiling and are indicative of the considerable temperature cooling effect such an extinguishment application can have on a fire. In instances where the foregoing temperature drop has been attained, the CPU 84 is operable to determine whether this has been the first such temperature drop in the training scenario, as indicated by block 152. As repeated application of extinguishing agent to the ceiling in a genuine fire emergency situation has less of a temperature reducing impact than the initial application, the program control of the system is written to account for this effect. Where no prior temperature drop has occurred, the CPU directs appropriate signal input to the valve control assembly 98 (FIG. 6) to effect a diminuition in burner flame height to the prescribed minimum established for the training scenario (block 154). In instances where previous temperature drops of the requisite magnitude (block 150) have occurred in the scenario, the CPU is operable to provide signal input to the valve assembly 98 to decrement flame height by a prescribed level, such as 2 ft. (0.75 m), as indicated by block 156.

As noted earlier, the temperature of the thermal mass assembly 200 (FIGS. 2 through 4) is monitored by the CPU 84 on the basis of signal output from the associated temperature sensor 204. Signal output from the temperature sensor 204 is preferably continuously monitored to determine whether or not there has occurred a temperature drop of a prescribed magnitude (block 158) for a given interval of time. The temperature drop must meet the following criteria to satisfy the condition of proper agent application, indicated at block 158:

Temp. Drop ≧ 5° F. + (Thermal Mass °F./200° F.)

In instances where such a temperature drop has taken place (implying the application of extinguishing agent to the thermal mass assembly 200 and/or its associated support structure), the burner flame height is decreased by the CPU 84 in the manner described above by a prescribed amount (block 166) such as 1 ft. (0.3 m). In accordance with the outcome of the thermal mass assembly temperature evaluation noted at block 158, the CPU 84 is operable to proceed with the scenario in accordance with the input of parameters at the scenario's outset relating to the selection of the flashover simulation as a part of the scenario, as indicated by block 170. For scenarios in which the reflash simulation has not been selected and the temperature of the thermal mass assembly is at or below the extinguishment temperature of the burner assembly (block 172), the CPU 84 effects cessation of fuel delivery to the burner assembly to end the scenario. However, if reflash has not been enabled and the temperature of the thermal mass assembly exceeds the burner extinguishment temperature, the CPU 84 is operable to proceed with scenario control in the manner described above following block 140 (FIG. 7A).

With continuing reference to the reflash enablement query (block 170), in instances where reflash has been enabled (i.e., selected for the scenario), output from the temperature sensor 204 of the thermal mass assembly 200 is evaluated by the CPU 84 in the manner indicated at block 174 to determine whether or not the sensed temperature exceeds the user-selected reflash temperature input into the system at the outset (block 132) of the scenario. in the flow diagram following start of the scenario. Where the sensed temperature of the thermal mass assembly 200 is at or below the set reflash temperature, the CPU 84 provides for signal output to the burner control valve assembly 98 (block 176) to effect a decrease in the quantity of fuel supplied to the burner assembly 38, thereby providing for a progressive reduction in flame height to extinguishment (i.e., closing of the fuel supply valves). At this point, reflash of the burner assembly is pending, as thermal energy from the environment (such as the burner grating or other support for the thermal mass assembly) is transferred by radiation, convection, and/or conduction to the thermal mass 202 and ultimately to its temperature sensor 204, despite the absence of a burner flame. A visually perceptible signal of the pending reflash is preferably provided at the console display 24 (block 178) to permit for discretionary supervisory input to personnel conducting the scenario or to trainees participating in the scenario. A reflash pending signal can optionally be provided directly at the local control panel 70 of the burn room, at which on site point supervisory personnel in their discretion can issue suitable instructions to the firefighter trainees or, in the event of unsafe firefighter proximity to the burner assembly, disable reflash altogether, as indicated by block 182. As the reflash timer counts down (block 184), the CPU 84 receives signal output from the temperature sensor 204 of the thermal mass assembly, which compares the signal input with stored data (block 172) to determine whether the sensed temperature exceeds the extinguishment temperature for the scenario for continuation of the scenario in the manner described above. Once the reflash timer reaches 0, the reflash pending indicator is cleared, as shown at block 186, the reflash timer is re-set (block 188), and the CPU 84 resumes with the scenario at the point preceding the flame height evaluation indicated at block 142. If the thermal mass assembly has not been sufficiently cooled during the reflash delay period, the burner assembly 38 will be re-ignited and burner flame height will be increased at the prescribed rate selected for the scenario, as indicated by blocks 144, 146 and 148, and the training scenario will continue to completion, or termination by supervisory personnel.

While the subject invention has been described in conjunction with preferred embodiments, it is to be understood and appreciated that the protection to be afforded the invention is defined by the accompanying claims and functional equivalents thereof, rather than by the specific features of the foregoing detailed description and accompanying drawings.

What is claimed is:

1. A method for detecting the presence of a genuine or simulated fire extinguishing agent and controlling flame height of a fuel-operable burner unit of a firefighter trainer in response thereto, comprising:
   providing a thermally conductive member exhibiting thermal mass and having a temperature sensor, and positioning said member in proximity to the burner unit;
   supplying fuel to the burner unit and igniting the fuel to produce a fire having flames;
   applying one of a fire extinguishing agent or a simulated fire extinguishing agent to said thermally conductive member for a period of time sufficient to effect a decrease in the temperature of said thermally conductive member;
   detecting application of said fire extinguishing agent or simulated extinguishing agent by sensing the temperature of said thermally conductive member using said temperature sensor; and
   controlling flame height in accordance with temperature sensed by said temperature sensor.

2. A method for controlling flame height of a fuel-operable burner unit of a firefighter trainer, comprising:
   positioning a thermally conductive member having a temperature sensor in proximity to the burner unit;
   supplying fuel to the burner unit and igniting the fuel to produce a fire having flames;
   controlling flame height in accordance with temperature sensed by said temperature sensor; and
   applying one of a fire extinguishing agent or a simulated fire extinguishing agent to said fire to effect cooling of said temperature sensor, thereby causing a reduction in burner flame height.

3. The method according to claim 1, wherein flame height is increasable at a prescribed rate once signal output from said temperature sensor indicates attainment of at least a threshold temperature value.

4. The method according to claim 3, wherein said rate of flame height increase is user selectable at the outset of a training scenario.

5. The method according to claim 2, wherein said fire is substantially extinguished upon application of said extinguishing agent and re-generated in the absence of a diminution in sensed temperature to a user selectable threshold temperature.

6. The method according to claim 2, wherein flame height is reduced by applying fire extinguishing agent to an auxiliary temperature sensor that is positioned remote from the burner unit.

7. The method according to claim 6, wherein flame height is reduced upon sensing by said auxiliary temperature sensor of a temperature drop of a user-selectable prescribed minimum temperature value.

8. The method according to claim 6, wherein said auxiliary temperature sensor is mounted near a trainer ceiling.

9. The method according to claim 1, wherein said thermally conductive member is securable to a thermally conductive structure overlying the burner unit.

10. The method according to claim 1, wherein said temperature sensor data is received by an automated processing unit operable to automatically control flame height in accordance with said received temperature sensor data.

11. The method according to claim 1, wherein flame height is controlled by regulating the rate of fuel delivery to the burner unit.

12. A system for detecting application of a fire extinguishing agent or a simulated fire extinguishing agent in a firefighter trainer containing a burner unit, comprising:
a thermally conductive member positionable adjacent to the burner unit, said thermally conductive member having a temperature sensor that produces an output that is variable in response to application to said thermally conductive member of one of a fire extinguishing agent or a simulated fire extinguishing agent for a period of time sufficient to effect a decrease in the temperature of said thermally conductive member; and
a burner control system operable to regulate flame height in the burner unit in accordance with said sensor output.

13. The system according to claim 12, wherein said flame control system is operable to decrement burner flame height in response to a diminution in sensed temperature of a prescribed rate.

14. The system according to claim 12, wherein said flame control system comprises an automated processing system that is operable to receive signal output from said temperature sensor and to generate signal output responsive thereto for effecting control of burner flame height.

15. The system according to claim 14, wherein said automated processing system implements flame height control by regulating fuel supply to the burner unit.

16. The system according to claim 15, wherein burner fuel supply is regulated by a valve assembly having an adjustably positionable valve mounted within a fuel supply line that extends between a fuel reservoir and the burner unit, said valve assembly being operable to receive variable signal output from said automated processing system and to position said valve in accordance with said signal output received thereby.

17. The system according to claim 14, wherein said burner control system comprises an input device for entry into the system of a user-selectable operation parameter for affecting signal output from said automated processing system.

18. The system according to claim 17, wherein said operation parameter is reflash activation temperature for the temperature sensor.

19. The system according to claim 17, wherein said operation parameter is maximum flame height.

20. The system according to claim 17, wherein said operation parameter is reflash delay time.

21. The system according to claim 17, wherein said operation parameter is fire extinguishment temperature.

22. The system according to claim 17, wherein said flame control system further comprises an auxiliary temperature sensor and said operation parameter is flame suppression temperature for diminishing flame height upon sensing by said auxiliary sensor of a temperature drop in excess of a prescribed value.

23. The system according to claim 22, wherein said auxiliary temperature sensor is mounted in proximity to a trainer ceiling.

24. The system according to claim 12, wherein said thermally conductive member comprises a metallic block and said temperature sensor comprises a thermocouple.

25. The system according to claim 24, wherein said thermocouple includes a tip that protrudes beyond a surface of the thermally conductive member.

26. The system according to claim 25, wherein said tip is oriented substantially transverse to the surface plane adjacent to said tip.

27. The system according to claim 24, wherein said thermally conductive member is comprised of a stainless steel selected from the group consisting of 306, 314 and Inconnel stainless steel.

28. The system according to claim 12, wherein said temperature sensor is adjustably positionable with respect to said thermally conductive member.

29. The system according to claim 12, wherein said thermally conductive member is adjustably positionable with respect to the burner unit.

30. The system according to claim 12, wherein the burner unit is provided with an overlying thermally conductive grating having a plurality of interstices, said thermally conductive member being mountable within at least one of said grating interstices in heat conducting relation therewith.

31. A method for sensing application of a fire extinguishing agent in a firefighter trainer containing a burner unit, comprising the steps of:
positioning a thermally conductive member having a temperature sensor in proximity to a burner unit;
operating the burner unit to produce a fire having flames;
applying a fire extinguishing agent in the vicinity of the burner flames;
sensing the temperature of the thermally conductive member with a temperature sensor; and
generating an output signal from the temperature sensor and adjusting burner flame height in accordance with said output signal.

32. The method according to claim 31, further comprising the step of selecting a threshold temperature value for said temperature sensor, monitoring said sensor signal output, and modifying burner operation once said threshold temperature value has been attained.

33. The method according to claim 31, wherein said selected temperature value is reflash activation temperature.

34. The method according to claim 31, wherein said selected temperature value is fire extinguishment temperature.

35. The method according to claim 34, further comprising the step of increasing flame height to a prescribed maximum level when said extinguishment temperature is not attained in a prescribed time interval.

36. The method according to claim 31, wherein the thermally conductive member is received within an interior portion of a heat conductive simulated structure so as to be isolated from physical contact with the applied extinguishing agent.

* * * * *